United States Patent [19]

Lanzarone et al.

[11] Patent Number: 5,089,940
[45] Date of Patent: Feb. 18, 1992

[54] FISH TANK AQUARIUM LIGHT HOOD

[76] Inventors: Patrick Lanzarone, 1349 80th St., Brooklyn, N.Y. 11228; George Spector, 233 Broadway #3815, New York, N.Y. 10007

[21] Appl. No.: 429,133

[22] Filed: Oct. 30, 1989

[51] Int. Cl.$^5$ .............................. F21V 33/00
[52] U.S. Cl. .................... 362/101; 362/267; 362/218; 362/250; 119/5
[58] Field of Search ............... 362/96, 101, 253, 267, 362/228, 260, 249, 250, 218; 119/5

[56] References Cited

U.S. PATENT DOCUMENTS

| | | | |
|---|---|---|---|
| 2,931,895 | 4/1960 | Wagenhauser | 362/267 |
| 3,066,645 | 12/1962 | Mulder | 119/5 |
| 3,834,351 | 9/1974 | Schmidt | 119/5 |
| 3,836,765 | 9/1974 | Ritzow et al. | 119/5 |
| 3,841,267 | 10/1974 | Miller | 119/5 |
| 3,857,366 | 12/1974 | Willinger | 119/5 |
| 4,206,719 | 6/1980 | Faris | 119/5 |
| 5,009,190 | 4/1991 | Gordon | 119/5 |

Primary Examiner—Ira S. Lazarus
Assistant Examiner—D. M. Cox

[57] ABSTRACT

An aquarium light hood is provided and consists of a box-like housing disposed over an aquarium tank that can carry a combination of fluorescent, metal halide and mercury vapor lighting fixtures. The hood can be adjustable to fit on various sized aquarium tanks.

3 Claims, 2 Drawing Sheets

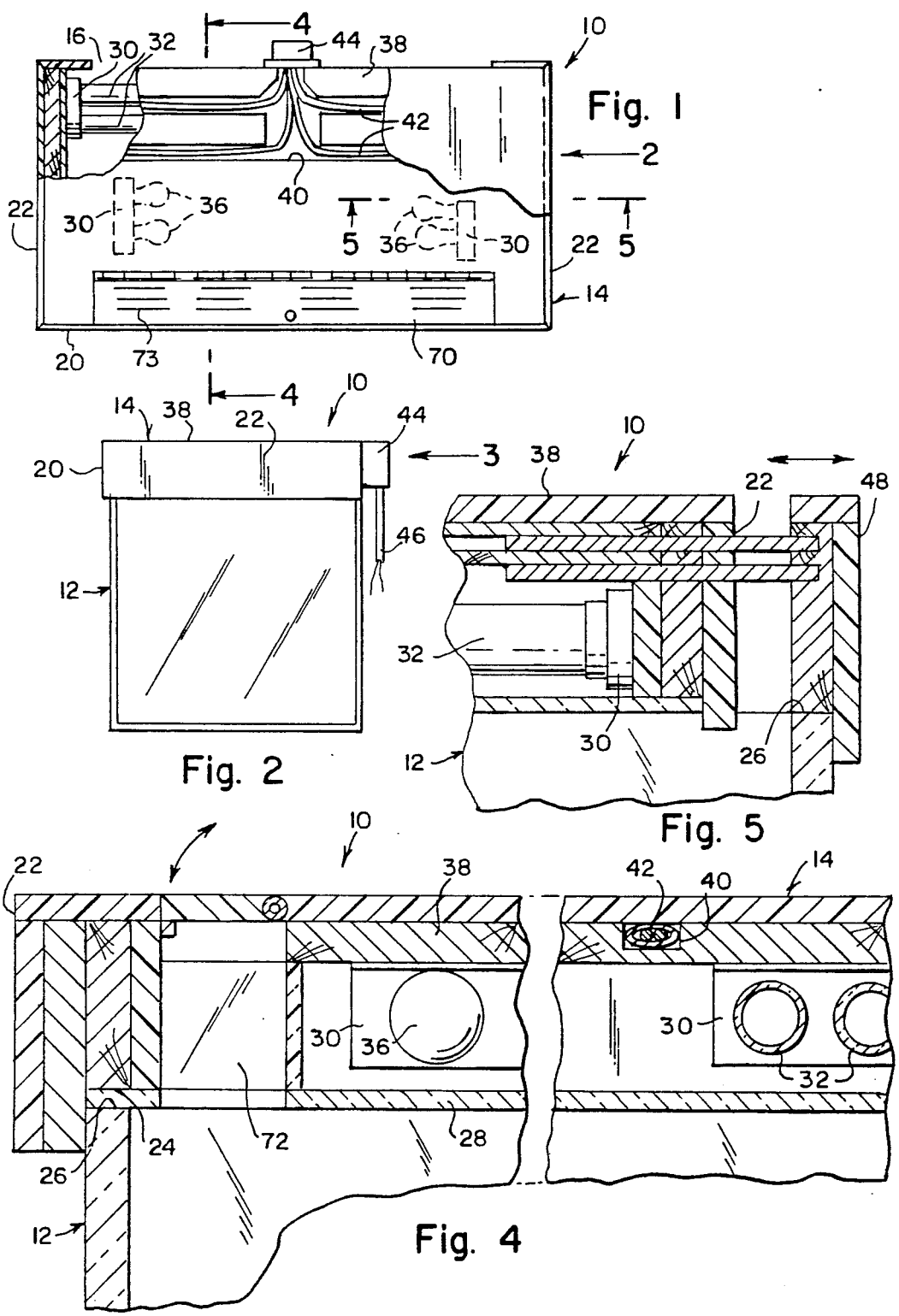

FISH TANK AQUARIUM LIGHT HOOD

BACKGROUND OF THE INVENTION

The instant invention relates generally to aqua-culture and aquariums and more specifically it relates to an aquarium light hood.

Numerous aquariums are available which include lamps mounted in the cover to make the aquariums more attractive and be a stimulus to the plants and fish located therein. While these known products may be suitable for the particular purpose to which they address, they would not be as suitable for the purposes of the present invention as heretofore described.

SUMMARY OF THE INVENTION

A primary object of the present invention is to provide an aquarium light hood that will overcome the shortcomings of the prior art devices.

Another object is to provide an aquarium light hood disposed over an aquarium tank that can carry either in separately or a combination of fluorescent, metal halide or mercury vapor light bulbs.

Another object is to provide an aquarium light hood in which the hood can be adjustable to fit on various sized aquarium tanks.

Another object is to provide an aquarium light hood that will completely cover the top of the tank while not interfering or slowing down the rate of gas exchange at the water surface.

A further object is to provide an aquarium light hood that is simple and easy to use.

A still further object is to provide an aquarium light hood that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a top view with parts broken away of the invention.

FIG. 2 is a side view as indicated by arrow 2 in FIG. 1, showing the hood on an aquarium tank.

FIG. 4 is an enlarged cross sectional view taken along line 4—4 in FIG. 1, showing the lamp mounting therein.

FIG. 5 is a cross sectional view taken along line 5—5 in FIG. 1, showing an adjustable feature for the hood to compensate for different sized aquarium tanks.

DETAILED DESCRIPTION OF THE PREFERRED EMBODIMENTS

Figure 3:
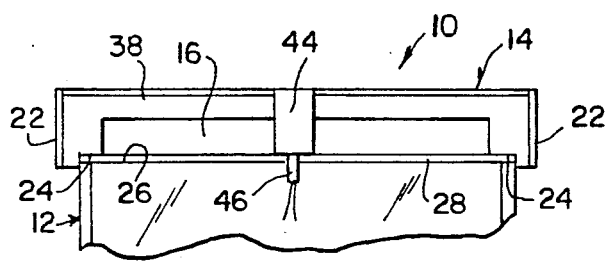
FIG. 3 is a rear view taken in direction of arrow 3 in FIG. 2.

Turning now descriptively to the drawings, in which similar reference characters denote similar elements throughout the several views, the Figures illustrate an aquarium light hood 10 for an aquarium tank 12 consisting of a box-like housing 14 that has an open back 16 for ventilation to reduce build-up of heat and gases therein. The front 20 and two side walls 22 have a bottom ledge 24 to rest upon top edge 26 of the aquarium tank 12. A cover glass 28 can be placed between the top edge 26 and the bottom ledge 24. Lighting fixtures 30 are disposed in the housing 14 for providing artificial illumination into the aquarium tank 12. Various type lighting fixtures 30 can hold fluorescent bulbs 32, metal halide bulbs 34 or mercury vapor light bulbs 38.

The housing 14 includes a top portion 38 having a channel 40 therein for carrying electrical wiring 42 away from the lighting fixtures 30. A terminal box 44 for the ballast may be remote or mounted at the open back 16 of the housing 14 for receiving the electrical wiring 42 and connecting to a power source, via cable 46, for supplying current to the lighting fixtures 30.

As shown in FIG. 5, one of the side walls 22 of the housing 14 can be adjustable at 48 for the hood 10 to compensate for different sized aquarium tanks 12.

Figure 10:
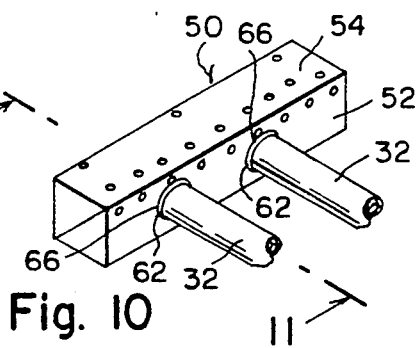
FIG. 10 is a perspective view of a waterproof fluorescent lamp holder used in the hood.
Figure 11:
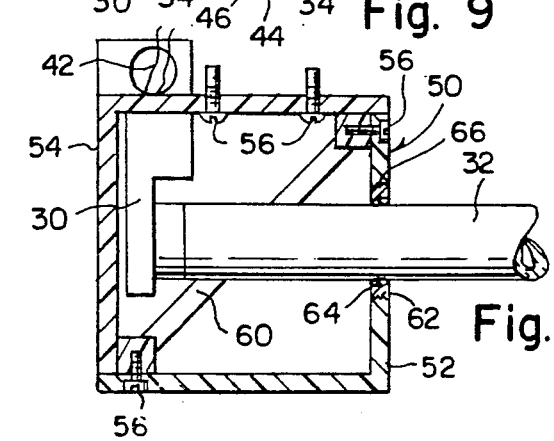
FIG. 11 is a cross sectional view taken along line 11—11 in FIG. 10, showing the internal structure thereof.

FIGS. 10 and 11 show one of the lighting fixtures 30 for the fluorescent light bulbs 32 contained in a sealed waterproof case 50. The case 50 is split on a diagonal so that the bottom half 52 is secured to top half 54 by screws 56. The case 50 is then secured by screws 58 to inside top of hood 10. A channel 60 extends between the mating edges of the two halves 52 and 54. A threaded ring 62 with rubber gasket 64 will seal around each fluorescent light bulb 32 that extends through the bottom half 52 of the case 50 when screwed into a corresponding hole 66.

Figure 6:
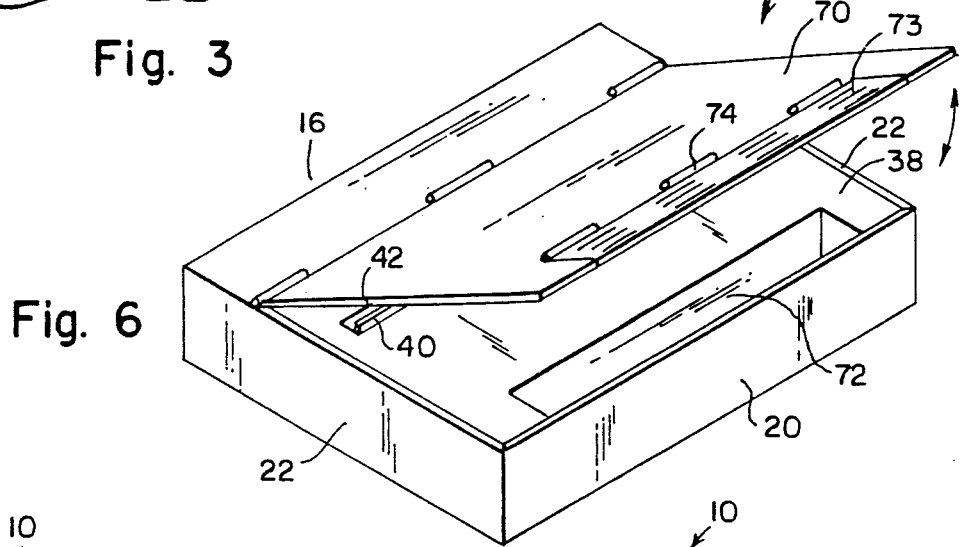
FIG. 6 is a perspective view of a modification in which the top of the hood can open.
Figure 7:
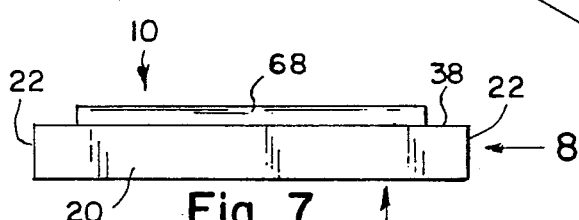
FIG. 7 is a front view of a modification in which alternative illumination is utilized within the hood.
Figure 8:
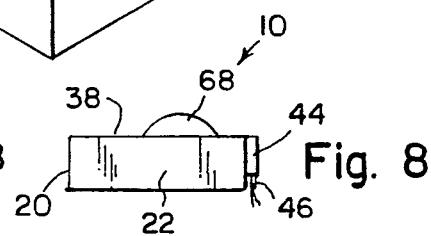
FIG. 8 is a side view taken in direction of arrow 8 in FIG. 7.
Figure 9:
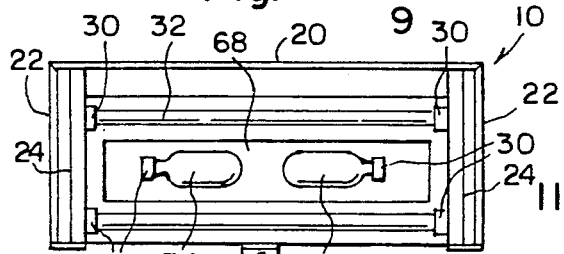
FIG. 9 is a bottom view taken in direction of arrow 9 in FIG. 7.

The hood 10 should include a raised dome 68 when using metal halide light bulbs 34 as shown in FIGS. 7, 8 and 9. The top 70 of the hood 10 could also open as shown in FIG. 6 to have access to the wiring 42 in the channel 40 and to get to a feeding hatch 72. Top 70 could also be hinged further back to open complete for greater access and be fenestrated or vented at 73 so to permit gas exchange. The vented portion 73 may also be hinged at 74.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An aquarium light hood for an aquarium tank which comprises:
   a) a box-like housing having an open back for ventilation to reduce buildup of heat and gases therein with front and two side walls having a bottom ledge to rest upon top edge of the aquarium tank;
   b) a lighting chamber in said housing with artificial lighting which projects light into the aquarium tank; wherein said housing further includes:

c) a top portion having a channel therein for carrying electrical wiring away from said artificial lighting;
d) internal grooves in said top portion, said grooves extended through an intermediate wall closing said chamber;
e) a terminal box for ballast to provide power;
f) a vented top door over said channel; wherein said housing further includes one of said side walls having tongue means projecting slidably and sealingly into said grooves in said intermediate wall to adjust the hood size, the accomodate different sized aquarium tanks, and seal said lighting chamber in adjusted positions.

2. An aquarium light hood as recited in claim 1, wherein said artificial lighting includeds lighting fixtures which sealingly encase end portions of said artificial lighting.

3. An aquarium light hood as recited in claim 2, wherein each said lighting fixtures include sealed end casings, in which said artificial lighting is mounted with intermediate portions that project externally from said casings through sealing rings on said casings.

* * * * *